(12) United States Patent
Toba

(10) Patent No.: US 8,196,700 B2
(45) Date of Patent: Jun. 12, 2012

(54) ANTI-VIBRATION DEVICE

(75) Inventor: Kousuke Toba, Chennai (IN)

(73) Assignee: Bridgestone Corporation, Tokyo (JP)

( * ) Notice: Subject to any disclaimer, the term of this patent is extended or adjusted under 35 U.S.C. 154(b) by 75 days.

(21) Appl. No.: 12/673,258

(22) PCT Filed: Jul. 15, 2008

(86) PCT No.: PCT/JP2008/062764
§ 371 (c)(1),
(2), (4) Date: Feb. 12, 2010

(87) PCT Pub. No.: WO2009/022515
PCT Pub. Date: Feb. 19, 2009

(65) Prior Publication Data
US 2011/0198149 A1 Aug. 18, 2011

(30) Foreign Application Priority Data
Aug. 13, 2007 (JP) ................................. 2007-210685

(51) Int. Cl.
*H05K 5/00* (2006.01)
(52) U.S. Cl. ...................................... 181/151; 181/148
(58) Field of Classification Search .................. 181/151, 181/148; 261/140.12
See application file for complete search history.

(56) References Cited

U.S. PATENT DOCUMENTS 4,711,206 A * 12/1987 Andra et al. ............. 267/140.13
4,903,591 A    2/1990 Nobile
(Continued)

FOREIGN PATENT DOCUMENTS
JP    60-175834 A    9/1985
(Continued)

OTHER PUBLICATIONS
International Search Report dated Oct. 14, 2008 (4 pages).

*Primary Examiner* — Forrest M Phillips
(74) *Attorney, Agent, or Firm* — Sughrue Mion, PLLC

(57) ABSTRACT

In an anti-vibration device 10 including: an outer cylinder 11, an attachment member 12, a rubber elastic portion 13 which elastically connects the outer cylinder 11 to the attachment member 12, a primary liquid chamber 16 which encloses a liquid therein by using the rubber elastic portion 13 as a part of a partition wall, a secondary liquid chamber 17 which encloses a liquid therein by using a diaphragm 14 as a part of a partition wall, an orifice 19 which allows the primary liquid chamber 16 and the secondary liquid chamber 17 to communicate with each other, a division member 15 which is provided between the primary liquid chamber 16 and the secondary liquid chamber 17, and a movable plate 18 which displaces in accordance with a pressure difference between the primary liquid chamber 16 and the secondary liquid chamber 17, the division member 15 including a first division plate 21 forming a part of the partition wall of the primary liquid chamber 16 and a second division plate 22 forming a part of the partition wall of the secondary liquid chamber 17, the movable plate 18 being disposed in a movable plate receiving portion between the first division plate 21 and the second division plate 22 disposed so as to face each other, the first division plate 21 and the second division plate 22 are integrally formed. According to the present invention, it is possible to provide an anti-vibration device capable of suppressing an occurrence of an abnormal noise.

5 Claims, 4 Drawing Sheets

U.S. PATENT DOCUMENTS

| | | | |
|---|---|---|---|
| 5,104,100 A * | 4/1992 | Simuttis | 267/140.13 |
| 5,139,240 A | 8/1992 | Miyamoto et al. | |
| 5,443,245 A | 8/1995 | Bellamy et al. | |
| 5,571,263 A * | 11/1996 | Koester et al. | 267/140.13 |
| 6,910,683 B2 * | 6/2005 | Itoh et al. | 267/140.13 |
| 7,258,332 B2 * | 8/2007 | Hiraoka | 267/140.13 |
| 7,328,888 B2 * | 2/2008 | Sakata | 267/140.13 |
| 7,419,144 B2 * | 9/2008 | Hasegawa et al. | 267/140.13 |
| 7,475,872 B2 * | 1/2009 | Kries et al. | 267/140.13 |
| 2004/0079601 A1 * | 4/2004 | Verriet | 188/322.15 |
| 2006/0066016 A1 * | 3/2006 | Hasegawa et al. | 267/140.13 |
| 2006/0097436 A1 * | 5/2006 | Yamamoto | 267/140.12 |

FOREIGN PATENT DOCUMENTS

| | | |
|---|---|---|
| JP | 63-280943 A | 11/1988 |
| JP | 2-132148 U | 11/1990 |
| JP | 6-221368 A | 8/1994 |
| JP | 2006-118583 A | 5/2006 |
| JP | 2006-250339 A | 9/2006 |
| JP | 2006-258215 A | 9/2006 |
| JP | 2007-177975 A | 7/2007 |

* cited by examiner

ANTI-VIBRATION DEVICE

TECHNICAL FIELD

The present invention relates to an anti-vibration device.
Priority is claimed on Japanese Patent Application No. 2007-210685, filed on Aug. 13, 2007, the content of which is incorporated herein by reference.

BACKGROUND ART

As an anti-vibration device which is applied to an automobile, an industrial machine, and the like so as to absorb and dampen vibrations of a vibration generating portion such as an engine, in the past, for example, there was known a liquid enclosure type anti-vibration device including: a first attachment tool, a second cylindrical attachment tool, an anti-vibration body connecting them to each other and formed from a rubber-like elastic material, a diaphragm attached to the second attachment tool and forming a liquid enclosure chamber between the anti-vibration body and the diaphragm, a division body dividing the liquid enclosure chamber into a first liquid chamber on the side of the anti-vibration body and a second liquid chamber on the side of the diaphragm, and an orifice which allows the first liquid chamber and the second liquid chamber to communicate with each other, wherein the division body includes an elastic division film and a pair of lattice members regulating a displacement amount of the elastic division film from both sides thereof (for example, refer to Patent Document 1).

[Patent Document 1] Japanese Unexamined Patent Application, First Publication No. 2006-118583

DISCLOSURE OF THE INVENTION

Problem to be Solved by the Invention

However, in the above-described anti-vibration device of Patent Document 1, the division body is formed as a pair of lattice members formed from a resin material, and the pair of lattice members is integrally formed by deposition. In addition, the division body is manufactured in such a manner that an elastic division film is interposed in a space formed between the pair of lattice members and the lattice members are bonded by deposition to each other. Accordingly, when the anti-vibration device starts to be used, the elastic division film of the division body is vibrated in the space by a pressure variation of the liquid chamber, but at this time, the elastic division film collides with the lattice members. A vibration is generated in a bonded position between the lattice members by the collision, which causes an abnormal noise.

The present invention is designed in consideration of the above-described circumstances, and provides an anti-vibration device capable of suppressing an occurrence of an abnormal noise.

Means for Solving the Problem

In order to solve the above-described problems, a first aspect of an anti-vibration device of the present invention includes: an outer cylinder which is connected to one of a vibration generating portion and a vibration receiving portion; an attachment member which is connected to the other of the vibration generating portion and the vibration receiving portion; a rubber elastic portion which elastically connects the outer cylinder to the attachment member; a primary liquid chamber which encloses a liquid therein by using the rubber elastic portion as a part of a partition wall and an internal volume of which changes by deformation of the rubber elastic portion; a secondary liquid chamber which encloses a liquid therein by using a diaphragm as a part of a partition wall and is able to expand and contract; an orifice which allows the primary liquid chamber and the secondary liquid chamber to communicate with each other; a division member which is disposed between the primary liquid chamber and the secondary liquid chamber; and a movable plate which displaces in accordance with a pressure difference between the primary liquid chamber and the secondary liquid chamber, wherein the division member includes a first division plate which forms a part of the partition wall of the primary liquid chamber and a second division plate which forms a part of the partition wall of the secondary liquid chamber, wherein the movable plate is disposed in a movable plate receiving portion between the first division plate and the second division plate disposed opposite to each other, and wherein the first division plate and the second division plate are integrally formed.

In a second aspect of the anti-vibration device of the present invention, the movable plate may be adapted to be insertable into the movable plate receiving portion from an opening formed in a part of a side wall connecting the first division plate and the second division plate.

In a third aspect of the anti-vibration device of the present invention, the orifice may be formed at a position not interfering with the movable plate receiving portion in the division member.

In a fourth aspect of the anti-vibration device of the present invention, the movable plate receiving portion may be configured so as to expand and open in a taper shape toward the opening from a blocking end of the side wall facing the opening.

In a fifth aspect of the anti-vibration device of the present invention, an outer surface shape of the movable plate may be formed in a shape similar to an inner surface shape of the movable plate receiving portion.

In a sixth aspect of the anti-vibration device of the present invention, the movable plate may be formed in a noncircular shape in plan view.

Effect of the Invention

In the first aspect of the anti-vibration device of the present invention, since it is possible to remove a bonded position between the first division plate and the second division plate of the division member, even when the movable plate is vibrated to thereby collide with the first division plate or the second division plate, there is an advantage in that it is possible to solve an occurrence of an abnormal noise caused by the collision between the division plates. In addition, since it is possible to reduce the number of parts of the division member, there is an advantage in that it is possible to suppress the manufacturing cost.

In the second aspect of the anti-vibration device of the present invention, there is an advantage in that it is possible to easily and reliably dispose the movable plate in the movable plate receiving portion.

In the third aspect of the anti-vibration device of the present invention, since the orifice is formed at a part of the division member where the movable plate receiving portion is not formed, there is an advantage in that it is possible to form the division member which efficiently utilizes a space.

In the fourth aspect of the anti-vibration device of the present invention, there is an advantage in that it is possible to easily extract a mold from the movable plate receiving portion upon molding the division plate member in which the first division plate and the second division plate are integrally formed.

In the fifth aspect of the anti-vibration device of the present invention, since the substantially uniform gaps are provided between the first division plate, the second division plate, and the movable plate, there is an advantage in that it is possible to easily tune anti-vibration characteristics and to reliably exhibit anti-vibration characteristics.

In the sixth aspect of the anti-vibration device of the present invention, since it is possible to maximally ensure a pressure receiving area of the movable plate, there is an advantage in that it is possible to alleviate an increase in pressure of the primary liquid chamber, and thus to suppress an increase in dynamic spring constant.

DESCRIPTION OF REFERENCE NUMERALS

10: ANTI-VIBRATION DEVICE
11: OUTER CYLINDER
12: ATTACHMENT MEMBER
13: RUBBER ELASTIC PORTION
14: DIAPHRAGM
15: DIVISION MEMBER
16: PRIMARY LIQUID CHAMBER
17: SECONDARY LIQUID CHAMBER
18: MOVABLE PLATE
21: FIRST DIVISION PLATE
22: SECOND DIVISION PLATE
27: SIDE WALL
27a: BLOCKING END
28: OPENING
29: MOVABLE PLATE RECEIVING PORTION

BEST MODE FOR CARRYING OUT THE INVENTION

Next, an embodiment of the present invention will be described with reference to FIGS. 1 to 6.

Figure 1:
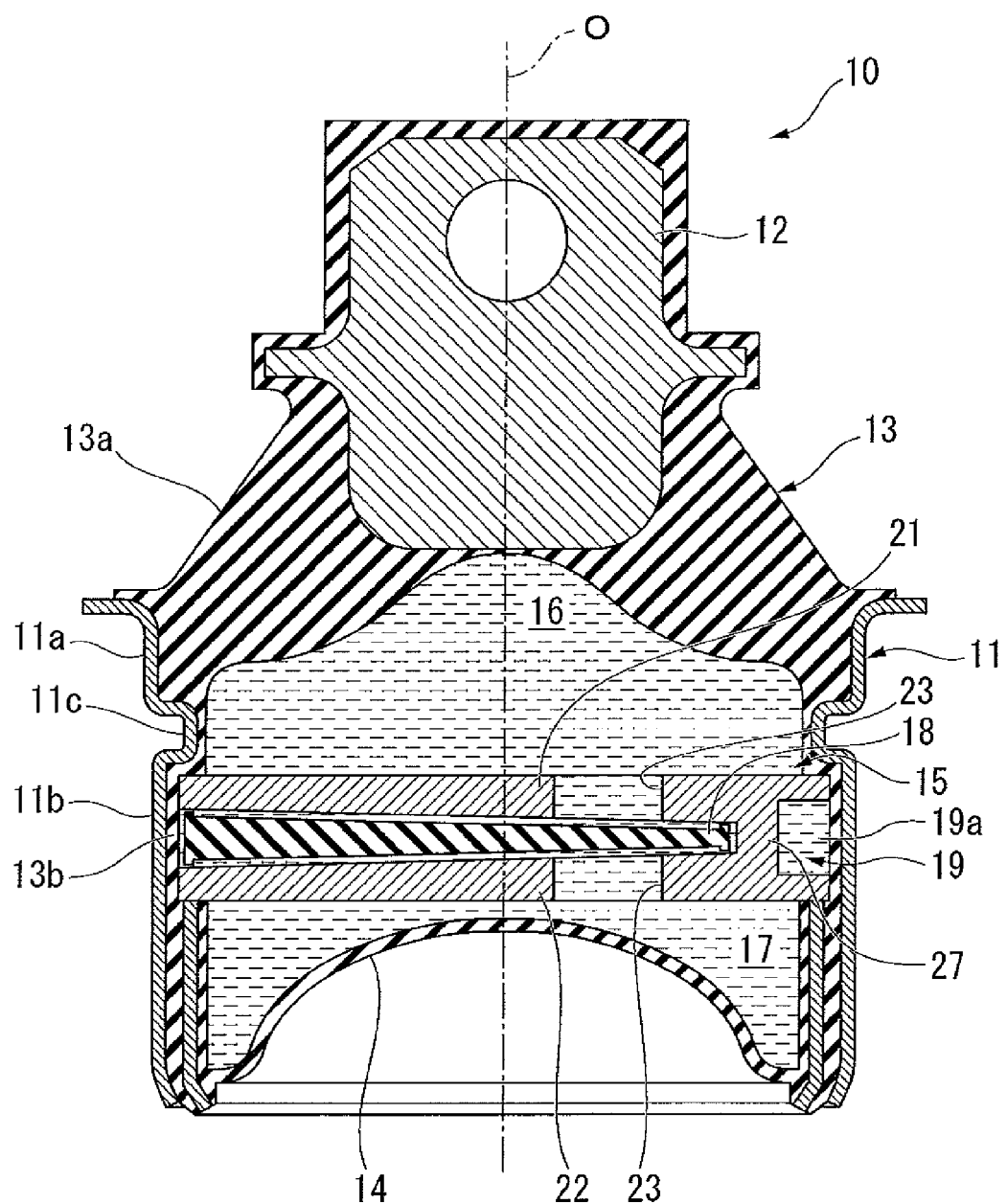
FIG. 1 is a front sectional view of an anti-vibration device according to an embodiment of the present invention.

FIG. 1 is a front sectional view of an anti-vibration device according to the embodiment.

As shown in FIG. 1, an anti-vibration device 10 includes an outer cylinder 11 which is connected to one of a vibration generating portion and a vibration receiving portion, an attachment member 12 which is connected to the other of the vibration generating portion and the vibration receiving portion, a rubber elastic portion 13 which elastically connects the attachment member 12 to the outer cylinder 11, a primary liquid chamber 16 which encloses a liquid therein by using the rubber elastic portion 13 as a part of a partition wall and an internal volume of which changes by deformation of the rubber elastic portion 13, a secondary liquid chamber 17 which encloses a liquid therein by using a diaphragm 14 as a part of a partition wall and is able to expand or contract, and a division member 15 which is provided between the primary liquid chamber 16 and the secondary liquid chamber 17.

In addition, such members are provided on the same axis with the central axis O. In addition, the primary liquid chamber 16 and the secondary liquid chamber 17 enclose, for example, ethylene glycol, water, silicone oil, or the like. In addition, in the case where the anti-vibration device 10 is attached to, for example, an automobile, the attachment member 12 is connected to an engine as a vibration generating portion, and the outer cylinder 11 is connected to a vehicle body as a vibration receiving portion through a bracket (not shown), thereby suppressing the vibration of the engine from being transmitted to the vehicle body.

The outer cylinder 11 includes a large diameter portion 11a which is disposed on one end in the axial direction, a small diameter portion 11b which is disposed on the other end in the axial direction, and a stepped portion 11c which connects the large diameter portion 11a to the small diameter portion 11b, and theses portions 11a to 11c are formed integrally and disposed on the same axis with the central axis O. In addition, the attachment member 12 is disposed closer to the outside in a direction of the central axis O than one end of the outer cylinder 11 in the axial direction. Then, an opening of one end of the outer cylinder 11 in the axial direction is liquid-tightly blocked by the rubber elastic portion 13, and also an opening on the other end of the outer cylinder 11 in the axial direction is liquid-tightly blocked by the diaphragm 14, thereby allowing a liquid to be enclosed in the inside of the outer cylinder 11.

In addition, the rubber elastic portion 13 includes a substantially conical body portion 13a which protrudes outward in the direction of the central axis O from the inner peripheral surface in one end of the outer cylinder 11 in the axial direction and a diameter of which is gradually decreased as it goes toward the outside in the direction of the central axis O, and a covering portion 13b which extends toward the other end of the outer cylinder 11 in the axial direction along the inner peripheral surface of the outer cylinder 11 from the body portion 13a, and these portions 13a and 13b are integrally formed. The covering portion 13b is cure-adhered to an entire area where the body portion 13a is not cure-adhered to the inner peripheral surface of the outer cylinder 11. Accordingly, the inner peripheral surface of the outer cylinder 11 is covered by the rubber elastic portion 13 throughout the entire area.

The division member 15 includes first and second division plates 21 and 22 which are disposed such that respective plate surfaces face each other, a movable plate 18 which is disposed between the division plates 21 and 22, and an orifice 19 which is fitted to the inside of the outer cylinder 11 and communicates with the primary liquid chamber 16 and the secondary liquid chamber 17. In addition, the division member 15 has a size which comes into contact with the covering portion 13b of the rubber elastic portion 13 in plan view.

Figure 2:
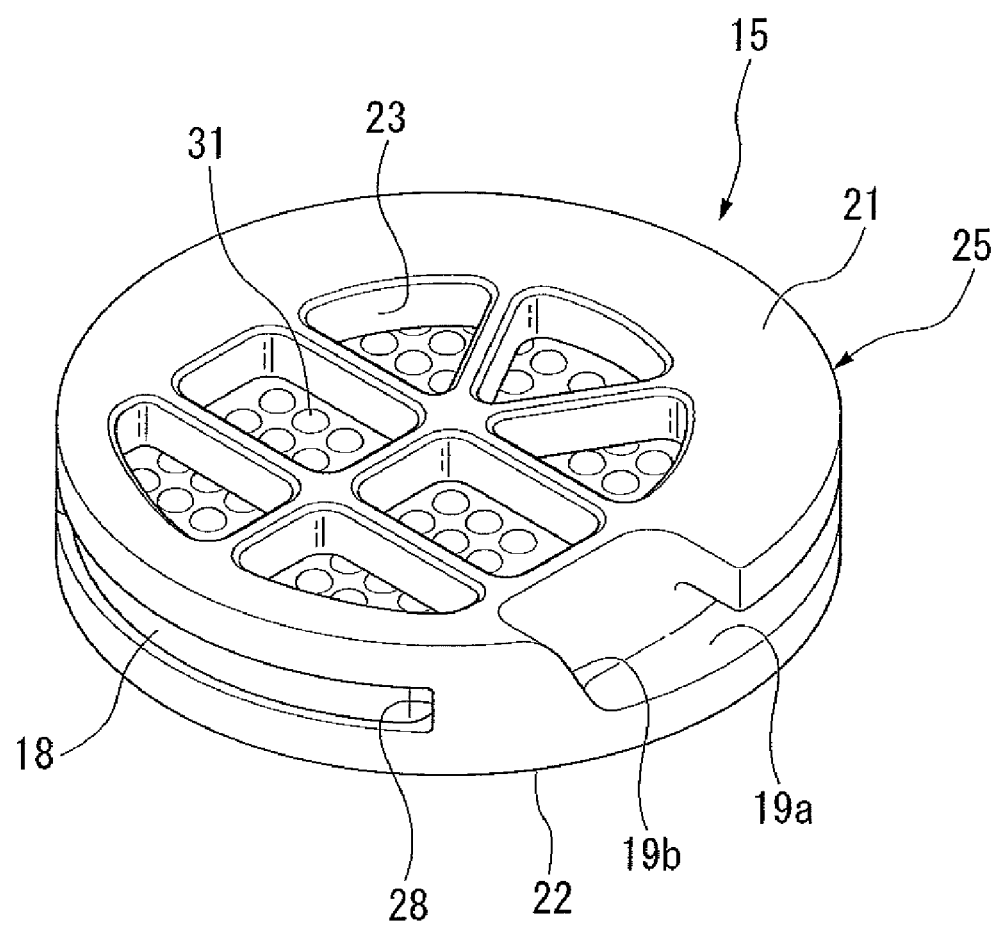
FIG. 2 is a perspective view of a division member according to the embodiment of the present invention.
Figure 3:
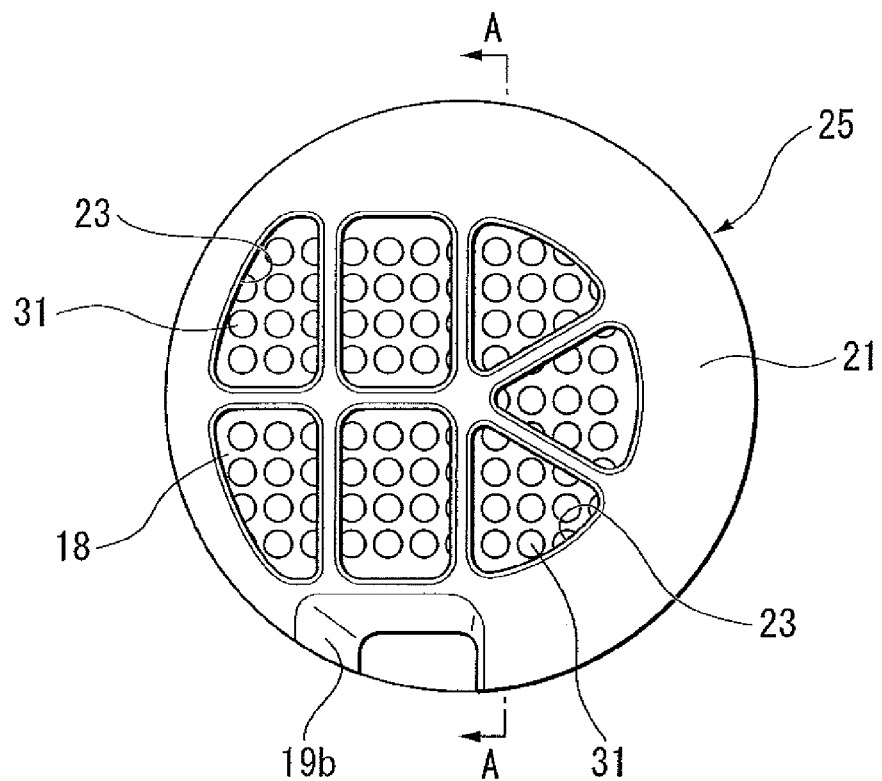
FIG. 3 is a plan view of the division member according to the embodiment of the present invention.
Figure 4:
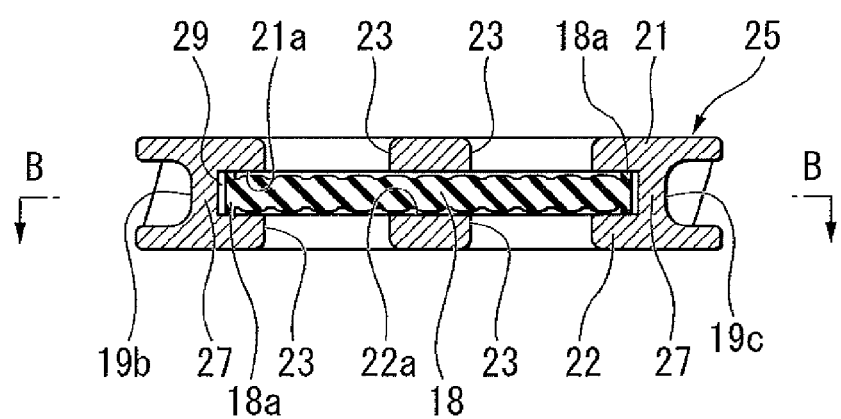
FIG. 4 is a sectional view taken along the line A-A of FIG. 3.
Figure 5:
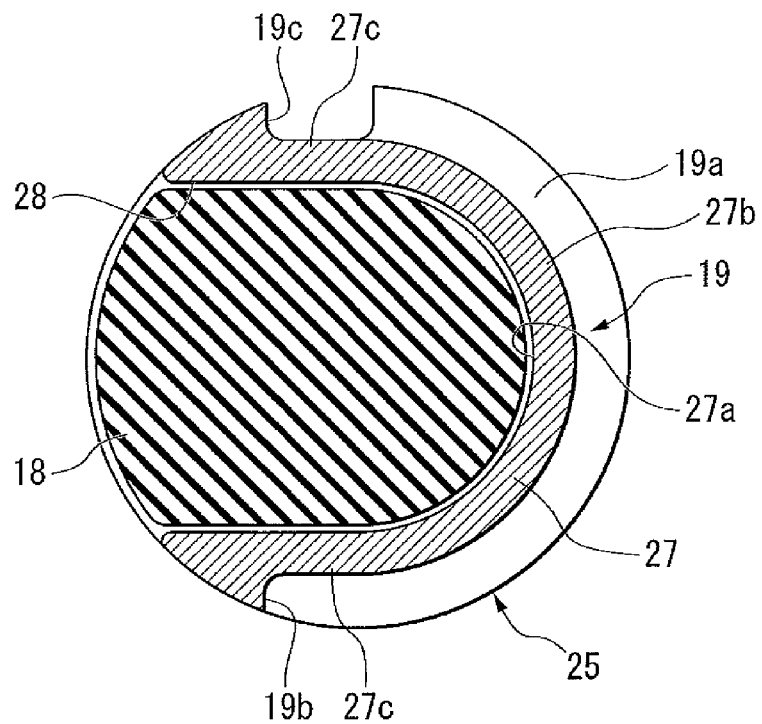
FIG. 5 is a sectional view taken along the line B-B of FIG. 4.
Figure 6:
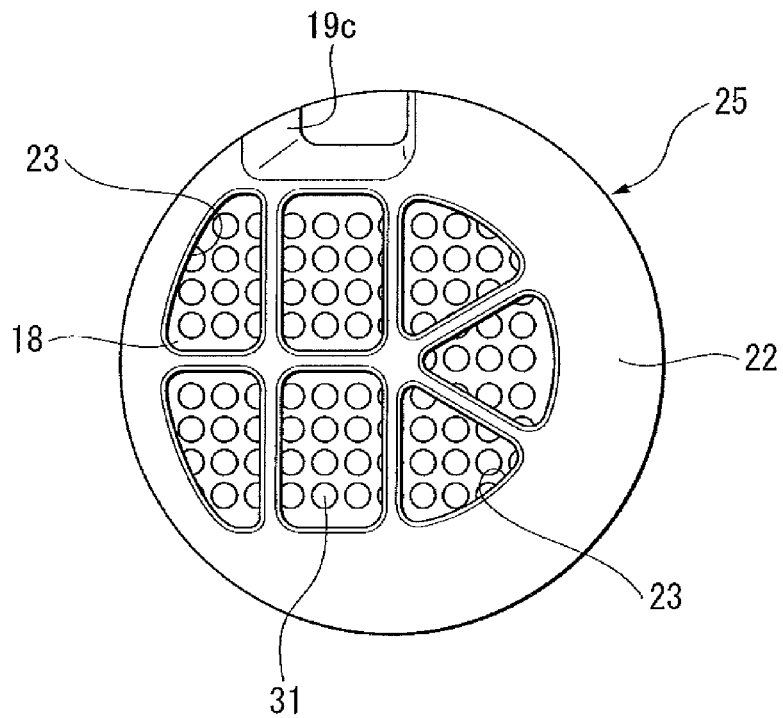
FIG. 6 is a rear view of the division member according to the embodiment of the present invention.

FIG. 2 is a perspective view of the division member 15 according to the embodiment, FIG. 3 is a plan view (top view) of the division member 15 according to the embodiment, FIG. 4 is a sectional view taken along the line A-A of FIG. 3, FIG. 5 is a sectional view taken along the line B-B of FIG. 4, and FIG. 6 is a rear view of the division member 15.

As shown in FIGS. 2 to 6, the first and second division plates 21 and 22 are disposed in the axial direction of the outer cylinder 11 so as to have a gap therebetween. In addition, the first division plate 21 fauns a part of a partition wall of the primary liquid chamber 16, and the second division plate 22 forms a part of a partition wall of the secondary liquid chamber 17. Each of division plates 21 and 22 is provided with plural perforation holes 23 which are formed at positions facing the movable plate 18.

The orifice 19 is provided with an orifice channel 19a which is disposed in the outer peripheral surface thereof so as to extend along the circumferential direction, a first channel 19b which communicates with the orifice channel 19a and the primary liquid chamber 16, and a second channel 19c which communicates with the orifice channel 19a and the secondary liquid chamber 17, and the primary liquid chamber 16 and the secondary liquid chamber 17 communicate with each other through the orifice channels 19a and the first and second channels 19b and 19c. For example, the orifice 19 is tuned so as to generate a liquid column resonance at the time of an engine shake vibration having a frequency of about 10 Hz.

Here, the first division plate 21 and the second division plate 22 are integrally formed, and are formed as a division plate portion 25. The division plate portion 25 is formed from, for example, aluminum alloy. In addition, the division plate portion 25 may be formed from a resin. The first division plate 21 and the second division plate 22 are connected to each other through a side wall 27. A space surrounded by an inner surface 21a of the first division plate 21, an inner surface 22a of the second division plate 22, and the side wall 27 is formed as a movable plate receiving portion 29 to which the movable plate 18 is inserted.

The side wall 27 is formed so as to follow the peripheral edge shape of the movable plate 18 inserted between the first division plate 21 and the second division plate 22, and includes a semi-circular cylindrical portion 27b and a pair of flat plate portions 27e which comes into contact with both ends of the semi-circular cylindrical portion 27b. The pair of flat plate portions 27c is installed so as to extend up to the outer peripheral surface of the division plate portion 25. In addition, an opening 28 is formed between the pair of flat plate portions 27e in the outer peripheral surface of the division plate portion 25. That is, it is configured such that the movable plate 18 is able to be inserted from the opening 28 to the movable plate receiving portion 29. In addition, at a position not interfering with the movable plate receiving portion 29, the orifice channel 19a is formed so as to follow the outer peripheral surface of the side wall 27. In addition, the inner surface 21a of the first division plate 21 and the inner surface 22a of the second division plate 22 are configured so as to expand and open in a taper shape toward the opening 28 from a blocking end 27a of the side wall 27 facing the opening 28 in the movable plate receiving portion 29.

The movable plate 18 is formed from, for example, a rubber-like elastic material, and has an outer surface shape following the inner surface shape of the movable plate receiving portion 29. That is, the movable plate 18 is formed in a shape substantially similar to the shape of the movable plate receiving portion 29, and the surface of the movable plate 18 is formed as a tapered surface. With such a configuration, when the movable plate 18 is disposed in the movable plate receiving portion 29, the substantially uniform gaps are provided between the surface of the movable plate 18, the inner surface 21a of the first division plate 21, and the inner surface 22a of the second division plate 22. In addition, plural spherical convex portions 31 are formed on the surface of the movable plate 18, and are configured to reduce a collision sound generated when the movable plate 18 is vibrated and collides with the respective division plates 21 and 22.

In addition, the movable plate 18 is formed to have a size capable of blocking all perforation holes 23 formed in the first division plate 21 and the second division plate 22. With such a configuration, when a large amplitude of vibration (pressure vibration) is generated, it is possible to exhibit a desired anti-vibration performance by using the orifice 19 without communication between the primary liquid chamber 16 and the secondary liquid chamber 17 through the peripheral edge portion of the movable plate 18.

In addition, both surfaces of the peripheral edge portion of the movable plate 18 are provided with thick portions 18a so as to come into contact with the inner surface 21a of the first division plate 21 and the inner surface 22a of the second division plate 22. By means of the thick portions 18a, it is possible to reliably divide between the primary liquid chamber 16 and the secondary liquid chamber 17 when a large amplitude of vibration is input.

(Effect)

In the anti-vibration device 10 with such a configuration, when a vibration (for example, an idle vibration having a frequency of about 30 Hz) having a minute amplitude (for example, ±0.2 mm or less) acts on the outer cylinder 11 or the attachment member 12 so that a pressure of a liquid inside the primary liquid chamber 16 is changed, the movable plate 18 is vibrated between the inner surface 21a of the first division plate 21 and the inner surface 22a of the second division plate 22, thereby absorbing and damping the vibration.

In addition, when a vibration (for example, an engine shake vibration having a frequency of about 10 Hz) having an amplitude larger than the above-described minute amplitude acts on the outer cylinder 11 or the attachment member 12 so that the pressure of a liquid inside the primary liquid chamber 16 is changed, the movable plate 18 comes into contact with the inner surface 21a of the first division plate 21 or the inner surface 22a of the second division plate 22, and the liquid flows between the primary liquid chamber 16 and the secondary liquid chamber 17 through the orifice 19, thereby absorbing and damping the vibration.

Here, in the case where the first division plate 21 and the second division plate 22 are formed as separate members, when the movable plate 18 is vibrated and comes into contact with the first division plate 21 or the second division plate 22, an original vibration of the first division plate 21 or the second division plate 22 is excited, and both repeatedly come into contact with each other and separate from each other, thereby generating an abnormal noise. However, in the embodiment, since the first division plate 21 and the second division plate 22 are integrally formed, it is possible to prevent an occurrence of an abnormal noise caused by the contact and separation of the first division plate 21 and the second division plate 22.

In addition, in the case where an abrupt pressure variation acts on the anti-vibration device 10, for example, when the primary liquid chamber 16 returns from the compressed state to the normal state, the inside of the primary liquid chamber 16 instantly becomes a negative pressure state, a part of the liquid evaporates to generate bubbles (cavitation), and a shock wave is generated when the negative pressure is released and a gas returns to a liquid, thereby vibrating the first division plate 21. Accordingly, in the case where the first division plate 21 and the second division plate 22 are formed as separate members, an abnormal noise is generated as in the above description, but in the embodiment, it is possible to prevent an occurrence of the abnormal noise caused by the contact and separation of the first division plate 21 and the second division plate 22.

According to the embodiment, in the anti-vibration device 10 including: the outer cylinder 11 which is connected to the vehicle body as the vibration receiving portion, the attachment member 12 which is connected to the engine as the vibration generating portion, the rubber elastic portion 13 which elastically connects the outer cylinder 11 and the attachment member 12, the primary liquid chamber 16 which encloses a liquid therein by using the rubber elastic portion 13 as a part of the partition wall and an internal volume of which changes by deformation of the rubber elastic portion 13, the secondary liquid chamber 17 which encloses a liquid therein by using the diaphragm 14 as a part of the partition wall and is able to expand or contract, the orifice 19 which allows the primary liquid chamber 16 and the secondary liquid chamber 17 to communicate with each other, the division member 15 which is provided between the primary liquid chamber 16 and the secondary liquid chamber 17, and the movable plate 18 which displaces in accordance with the pressure difference between the primary liquid chamber 16 and the secondary liquid chamber 17, wherein the division member 15 includes the first division plate 21 which forms a part of the partition wall of the primary liquid chamber 16 and the second division plate 22 which forms a part of the partition wall of the secondary liquid chamber 17, wherein the movable plate 18 is disposed in the movable plate receiving portion 29 between the first division plate 21 and the second division plate 22 disposed opposite to each other, and wherein the first division plate 21 and the second division plate 22 are integrally formed.

With such a configuration, it is possible to remove a bonded position of the first division plate 21 and the second division plate 22 of the division member 15, and to solve the occurrence of the abnormal noise caused by the collision between the division plates 21 and 22 even when the vibration plate 18 is vibrated to thereby collide with the first division plate 21 or the second division plate 22. In addition, since it is possible to reduce the number of parts of the division member 15, it is possible to reduce manufacturing cost.

In addition, the division member 15 is configured such that the movable plate 18 is able to be inserted into the movable plate receiving portion 29 from the opening 28 formed in a part of the side wall 27 connecting the first division plate 21 and the second division plate 22.

With such a configuration, it is possible to easily and reliably dispose the movable plate 18 in the movable plate receiving portion 29.

In addition, the orifice 19 is formed at a position not interfering with the movable plate receiving portion 29 in the side wall 27.

With such a configuration, since the orifice 19 is formed at a part of the side wall 27 where the movable plate receiving portion 29 is not formed, it is possible to form the division member 15 which efficiently utilizes a space.

In addition, the movable plate receiving portion 29 is configured so as to expand and open in a taper shape toward the opening 28 from the blocking end 27a of the side wall 27 facing the opening 28.

With such a configuration, upon molding the division plate portion 25 in which the first division plate 21 and the second division plate 22 are integrally formed, it is possible to easily extract a mold from the movable receiving portion 29.

In addition, the outer surface shape of the movable plate 18 is formed in a shape similar to the inner surface shape of the movable plate receiving portion 29. With such a configuration, since the substantially uniform gaps are provided between the first division plate 21, the second division plate 22, and the movable plate 18, it is possible to easily tune anti-vibration characteristics and to reliably exhibit anti-vibration characteristics.

In addition, the movable plate 18 is formed in a noncircular shape in plan view.

With such a configuration, since it is possible to maximally ensure a pressure receiving area of the movable plate 18, it is possible to alleviate an increase in pressure of the primary liquid chamber 16, and thus to suppress an increase in dynamic spring constant.

In addition, the technical scope of the present invention is not limited to the above-described embodiment, and includes the modifications added to the above-described embodiment within the scope not departing from the spirit of the present invention. That is, detailed materials, configurations, or the like in the embodiment are merely an example, and may be appropriately modified.

For example, in the embodiment, a case has been described in which the engine is connected to the attachment member and the outer cylinder is connected to the vehicle body, but the engine may be connected to the outer cylinder and the attachment member may be connected to the vehicle body or the anti-vibration device may be installed in other vibration generating portions and vibration receiving portions.

In addition, in the embodiment, a configuration has been described in which the movable plate is inserted from the opening, but the movable plate may be inserted from the perforation hole. With such a configuration, it is not necessary to provide the opening or the taper used for an extraction of a mold.

In addition, in the embodiment, a configuration has been described in which the movable plate is formed from a rubber-like elastic material, but may be formed from a resin material.

In addition, in the embodiment, a configuration has been described in which the entire vibration plate is vibrated, but a part of the movable plate may be fixed to the division plate so that the remainder portion is vibrated. With such a configuration, it is possible to reduce a rattling noise generated when the movable plate collides with the division plate.

In addition, in the embodiment, the surface of the movable plate is formed in a taper shape, but the front and rear surfaces of the movable plate may be formed as parallel surfaces. With such a configuration, since the movable plate is vibrated while gradually coming into contact with the division plate, it is possible to reduce the rattling sound.

In addition, in the embodiment, the orifice is provided on the outside of the movable plate receiving portion, but the movable plate receiving portion and the orifice may be disposed in parallel in the direction of the central axis. With such a configuration, it is possible to ensure the length of the orifice.

[Industrial Applicability]

It is possible to provide an anti-vibration device capable of suppressing an occurrence of an abnormal noise.

The invention claimed is:

1. An anti-vibration device comprising:
an outer cylinder which is connected to one of a vibration generating portion and a vibration receiving portion;
an attachment member which is connected to the other of the vibration generating portion and the vibration receiving portion;
a rubber elastic portion which elastically connects the outer cylinder to the attachment member;
a primary liquid chamber which encloses a liquid therein by using the rubber elastic portion as a part of a partition wall and an internal volume of which changes by deformation of the rubber elastic portion;
a secondary liquid chamber which encloses a liquid therein by using a diaphragm as a part of a partition wall and is able to expand and contract;

an orifice which allows the primary liquid chamber and the secondary liquid chamber to communicate with each other;

a division member which includes a first division plate forming a part of the partition wall of the primary liquid chamber and a second division plate forming a part of the partition wall of the secondary liquid chamber and disposed so as to face the first division plate, and is disposed between the primary liquid chamber and the secondary liquid chamber;

a movable plate which displaces in accordance with a pressure difference between the primary liquid chamber and the secondary liquid chamber; and a movable plate receiving portion which is formed between the first division plate and the second division plate disposed so as to face each other, and has the movable plate disposed therein, wherein the first division plate and the second division plate are integrally formed, wherein the movable plate is configured to be insertable into the movable plate receiving portion from an opening formed in a part of a side wall connecting the first division plate and the second division plate, and the orifice is formed at a position not interfering with the movable plate receiving portion in the division member.

2. The anti-vibration device according to claim 1, wherein the movable plate receiving portion is configured so as to expand and open in a taper shape toward the opening from a blocking end of the side wall facing the opening.

3. The anti-vibration device according to claim 1, wherein an outer surface shape of the movable plate is formed in a shape similar to an inner surface shape of the movable plate receiving portion.

4. The anti-vibration device according to claim 1, wherein the movable plate is formed in a noncircular shape in plan view.

5. The anti-vibration device according to claim 1, wherein the division member is placed inside the outer cylinder, and the opening is closed by the outer cylinder.

* * * * *